(12) United States Patent
Hasegawa

(10) Patent No.: US 7,796,178 B2
(45) Date of Patent: Sep. 14, 2010

(54) CAMERA CAPABLE OF STORING THE CENTRAL COORDINATES OF A REPRODUCTION IMAGE THAT HAS BEEN ENLARGED

(75) Inventor: Junko Hasegawa, Atsugi (JP)

(73) Assignee: Nikon Corporation, Tokyo (JP)

( * ) Notice: Subject to any disclaimer, the term of this patent is extended or adjusted under 35 U.S.C. 154(b) by 343 days.

(21) Appl. No.: 11/878,265

(22) Filed: Jul. 23, 2007

(65) Prior Publication Data
US 2008/0030609 A1 Feb. 7, 2008

(30) Foreign Application Priority Data
Jul. 27, 2006 (JP) ............................. 2006-204751

(51) Int. Cl.
H04N 5/222 (2006.01)
H04N 5/262 (2006.01)
(52) U.S. Cl. ............................... 348/333.01; 348/240.2
(58) Field of Classification Search ............ 348/333.03, 348/333.05, 333.08, 333.09, 240.99, 240.2
See application file for complete search history.

(56) References Cited

U.S. PATENT DOCUMENTS

| | | | |
|---|---|---|---|
| 6,741,280 B1 | 5/2004 | Shioji | |
| 7,213,215 B2 * | 5/2007 | Park | 348/333.01 |
| 7,298,409 B1 * | 11/2007 | Misawa | 348/333.01 |
| 2003/0095198 A1 * | 5/2003 | Onuki et al. | 348/333.05 |
| 2003/0169343 A1 | 9/2003 | Kagaya et al. | |
| 2004/0169760 A1 * | 9/2004 | Furukawa | 348/333.12 |
| 2005/0083350 A1 | 4/2005 | Battles | |
| 2006/0038908 A1 | 2/2006 | Yoshino | |
| 2006/0221203 A1 * | 10/2006 | Abe et al. | 348/222.1 |

FOREIGN PATENT DOCUMENTS

| | | |
|---|---|---|
| JP | A 2000-232598 | 8/2000 |
| JP | A 2004-260715 | 9/2004 |

OTHER PUBLICATIONS

Phil Askey: "Olympus E-330 EVOLT Review" DPREVIEW, [Online], Mar. 18, 2006, XP002448836 retrieved from the internet: URL: http://www.dpreview.com/reviews/OlympusE330/page8.asp> [retrieved on Aug. 30, 2007], paragraphs [Image], [Magnify].

(Continued)

*Primary Examiner*—Luong T Nguyen
(74) *Attorney, Agent, or Firm*—Oliff & Berridge, PLC

(57) ABSTRACT

A camera comprises a reproduction mode changeover unit that changes over between a single image reproduction mode and a magnified reproduction mode; a display position change unit that changes a center coordinate point of an image; a display center storage unit that stores the center coordinate point of the image; an enlargement position flag storage unit that stores either one of a first flag and a second flag; and a control unit that, when the magnified reproduction mode has been changed to the single image reproduction mode in a first operational manner, stores the first flag in the enlargement position flag storage unit, and, when the magnified reproduction mode has been changed to the single image reproduction mode in a second operational manner, stores the second flag in the enlargement position flag storage unit.

9 Claims, 7 Drawing Sheets

OTHER PUBLICATIONS

Simon Joinson: "Samsung Pro815 Review" DPREVIEW, [Online], Jul. 12, 2005, XP002448847 Retrieved from the internet: URL:http://www.dpreview.com.reviews/samsungpro815/page3.asp> [retrieved on Aug. 30, 2007], p. 3; figure 8 .

DPREVIEW, [Online], Aug. 30, 2007, XP002448837, retrieved from the internet: URL:http://dpreview.com/reviews/> [retrieved on Aug. 30, 2007], proof of the publication date of documents D1 and D2, p. 2, lines 17, 24, paragraph Reviews-Chronological.

* cited by examiner

CAMERA CAPABLE OF STORING THE CENTRAL COORDINATES OF A REPRODUCTION IMAGE THAT HAS BEEN ENLARGED

INCORPORATION BY REFERENCE

The disclosure of the following priority application is herein incorporated by reference:

Japanese Patent Application No. 2006-204751, filed Jul. 27, 2006.

BACKGROUND OF THE INVENTION

1. Field of the Invention

The present invention relates to a camera that is capable of storing the central coordinates of a reproduction image that has been enlarged.

2. Description of Related Art

A camera is known that changes the magnification ratio of an image that is displayed upon an external display and the region of the image that is enlarged. And, in Japanese Laid-Open Patent Publication 2004-260715, there is disclosed a camera in which the magnification ratio and the magnification region that have been changed are applied to a plurality of images that are displayed in succession.

SUMMARY OF THE INVENTION

However there is the problem that, when the camera has been returned to single image reproduction subsequent to enlarged reproduction, if the same portion is to be displayed as enlarged for a second time, then it is necessary to perform operation to shift the enlargement region to the desired position.

A camera according to the present invention comprises: a storage control unit that stores an image data; a display device that displays an image based upon the image data on a display screen; a reproduction mode changeover member that, upon operation by a user, outputs a changeover command signal to change over between a single image reproduction mode in which a single image is displayed upon the display device, and a magnified reproduction mode in which a display magnification rate of the image that is displayed upon the display can be varied; a reproduction mode changeover unit that changes over between the single image reproduction mode and the magnified reproduction mode, according to the changeover command signal; a display position command member that, upon operation by the user, outputs a position change signal that commands variation of a center coordinate point of the image displayed upon the display device; a display position change unit that changes the center coordinate point of the image, according to the position change signal; a display center storage unit that, in the magnified reproduction mode, stores the center coordinate point of the image that has been varied by the display position change unit; an enlargement position flag storage unit that stores either one of a first flag and a second flag, (i) the reproduction image being magnified and displayed with the center coordinate point stored in the display center storage unit, when the reproduction mode changeover unit changes over the reproduction mode to the magnified reproduction mode and the first flag is stored in the enlargement position flag storage unit, (ii) the reproduction image being magnified and displayed with a fixed center coordinate point pf the image set in advance, when the reproduction mode changeover unit changes over the reproduction mode to the magnified reproduction mode and the second flag is stored in the enlargement position flag storage units; and a control unit that, when the magnified reproduction mode has been changed to the single image reproduction mode in a first operational manner, stores the first flag in the enlargement position flag storage unit, and, when the magnified reproduction mode has been changed to the single image reproduction mode in a second operational manner, stores the second flag in the enlargement position flag storage unit.

It is preferable that the camera further comprises: a reduction command member that, in the magnified reproduction mode, upon operation by the user, outputs a reduction command signal for commanding reduction of the display magnification rate of the image; and wherein: in the first operational manner, the control unit changes the magnified reproduction mode to the single image reproduction mode in accordance with operation of the reduction command member. Furthermore, in the second operational manner, the control unit may change the magnified reproduction mode to the single image reproduction mode based upon a single operation.

In the camera with the enlargement position flag storage unit, when the first flag is stored in the enlargement position flag storage unit in the single image reproduction mode, if frame advance or frame return is performed, the control unit can store the second flag in the enlargement position flag storage unit in stead of the first flag.

In the camera described above, when image reproduction in the magnified reproduction mode is commanded in the state in which the first flag is stored in the enlargement position flag storage unit, the display device may display the image at the center of the display screen, the image being magnified with the center coordinate point that is stored in the display center storage unit.

This camera may further comprises: a judging unit that judges whether or not a range of the image to be reduced is beyond a range of an original image of the magnified image displayed upon the display screen when an image is reduced and displayed with the center coordinate point stored in the display center storage unit; and a center coordinate point change unit that changes the center coordinate point so that the range of the image to be reduced is not beyond the range of the original image, when the judging unit judges that the range of the image to be reduced is beyond the range of the original image.

The camera with reduction command member can further comprise: a superimposed display control unit that controls the display device to display an original image of the magnified image in a predetermined small area as superimposed upon the image that has been enlarged in the magnified reproduction mode. It is preferable that the camera further comprises: an enlargement command member that, in the magnified reproduction mode, upon operation by the user, outputs an enlargement command signal for commanding enlargement of the display magnification rate of the image; and wherein: if a predetermined time period has elapsed without any command being issued from the enlargement command member, the reduction command member, and the display position command member, the superimposed display control unit terminates displaying of the original image at the predetermined small area upon the display screen.

A camera according to the another aspect of the invention comprises: a display control unit that, in a reproduction display mode including a single image reproduction mode and a magnified reproduction mode, displays an image upon a display device, the image being magnified by using an original image at a display magnification rate that is determined in advance, an enlargement command member that, upon operation by a user, commands enlargement of the display magnification rate of the image; and a reduction command member that, upon operation by a user, commands reduction of the display magnification rate of the image; and wherein: in the magnified reproduction mode, the display control unit displays the original image in a predetermined small area which is superimposed on the magnified reproduction image with the display magnification rate set in advance.

The camera may further comprise: a display position command member that, upon operation by the user, outputs a position change signal that commands variation of a center coordinate point of the image displayed upon the display device; and wherein: if a predetermined time period has elapsed without any command being issued from the enlargement command member, the reduction command member, and the display position command member, the display control unit terminates the displaying of the original image in the predetermined small area.

DESCRIPTION OF THE PREFERRED EMBODIMENTS

Figure 1:
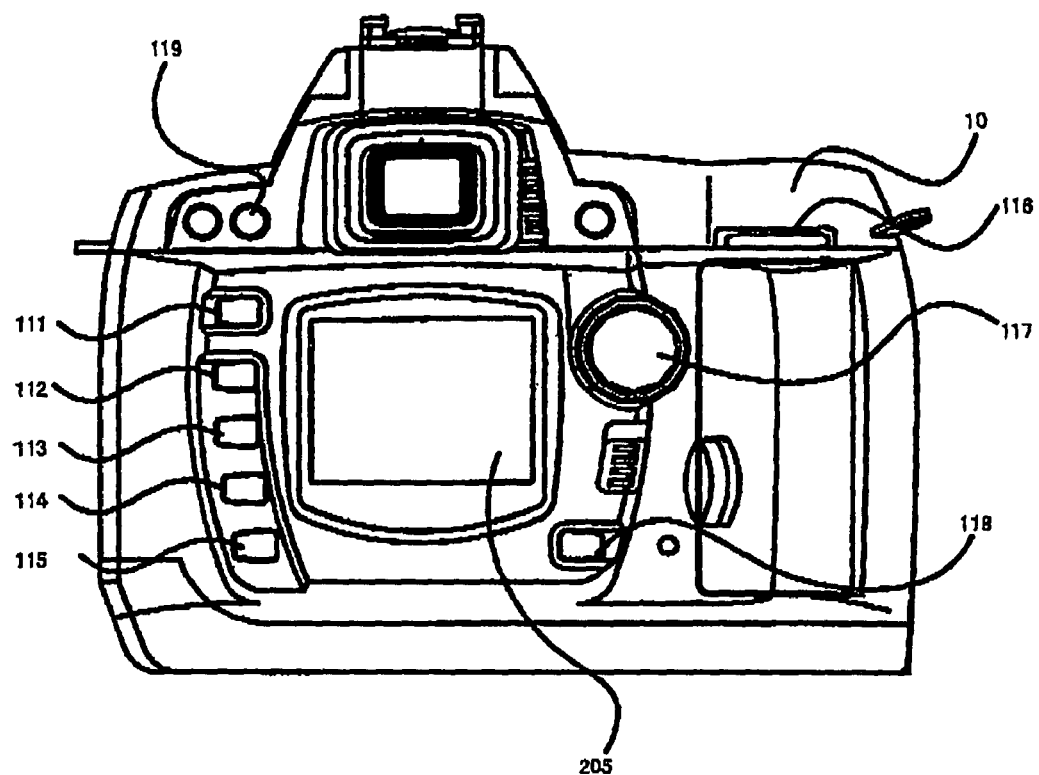
FIG. 1 is a rear view showing the external appearance of a camera according to an embodiment of the present invention.

A camera according to the present invention will now be explained with reference to FIGS. 1 through 5. FIG. 1 is a rear view for explanation of the external appearance of this electronic camera, and FIG. 2 is a structural diagram showing its principal portions.

As shown in FIG. 1, on the rear surface of a body 10 of this camera, there are provided a liquid crystal monitor 205, a replay button 111, a menu button 112, a reproduction button 113, an enlargement button 114, a protection button 115, a command dial 116, an actuation member 117, an OK button 118, and a deletion button 119.

Figure 2:
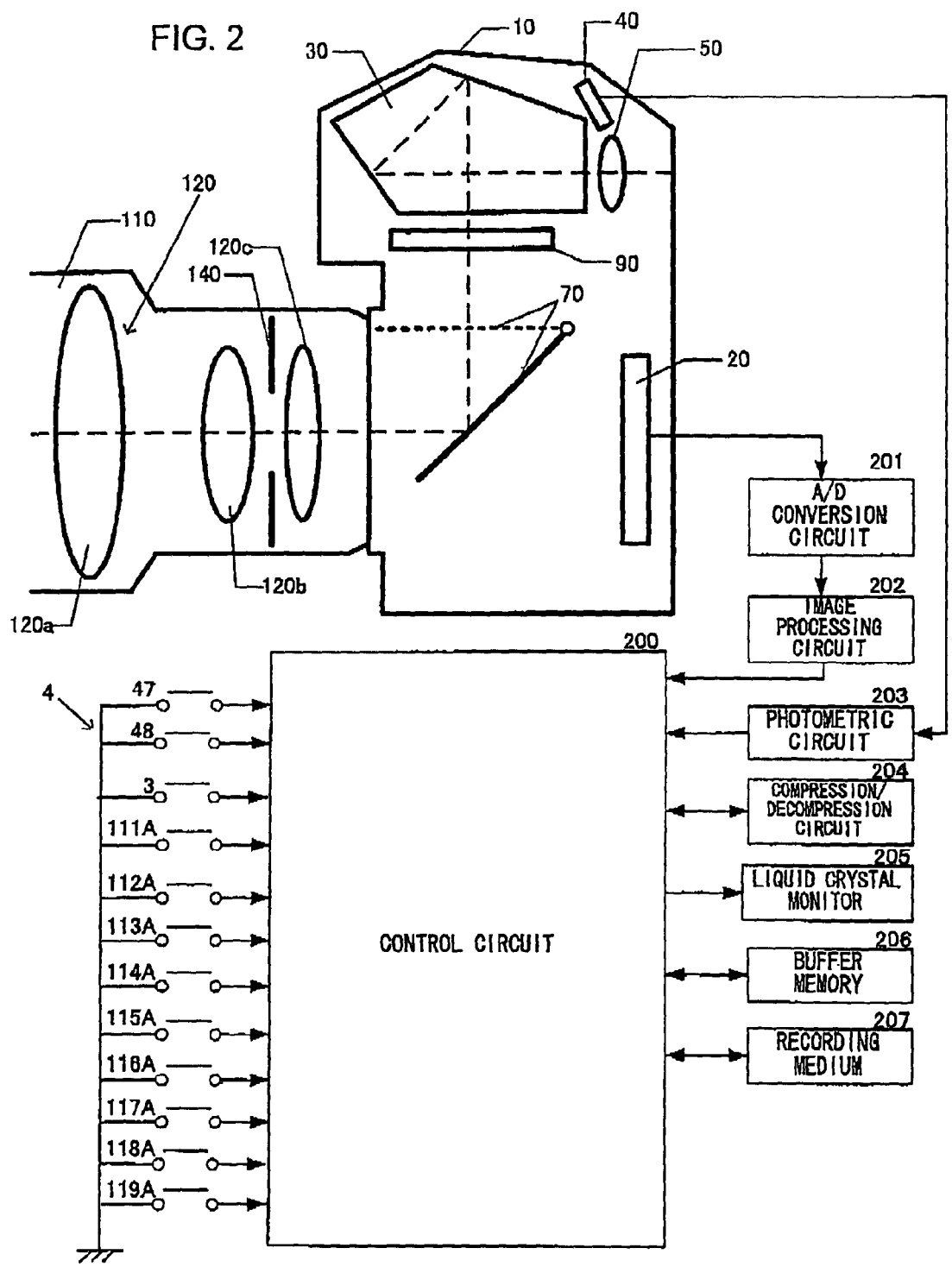
FIG. 2 is a structural diagram showing the main portions of this camera according to the embodiment.

In FIG. 2, the camera body 10 is provided with an interchangeable lens barrel 110 comprising a photographic lens 120. Within this lens barrel 110, there are provided the photographic lens 120 that consists of lens groups 120a through 120c, and an iris 140.

An image-capturing element 20 for capturing an image of a photographic subject is provided in the interior of the camera body 10. For this image-capturing element 20, a CCD or a CMOS element may be utilized. Between the photographic lens 120 and the image-capturing element 20, there is provided a quick return mirror 70 that reflects light from the photographic subject that has passed through the photographic lens 120, to a view finder optical system.

This light from the photographic subject that has been reflected by the quick return mirror 70 is imaged upon a focusing screen 90 that is provided in a position optically equivalent to which of the image-capturing element 20. The image of the photographic subject that has thus been imaged upon the focusing screen 90 can be observed by the photographer from a penta prism 30 via an eyepiece lens 50. This image is also conducted from the penta prism 30 to a light reception surface of a photometric sensor 40.

During photography, the quick return mirror 70 is shifted away from the optical path of the light from the photographic subject (as shown by the broken line in FIG. 2), so that an image of the photographic subject is formed upon the image-capturing element 20. This image-capturing element 20 performs accumulation of electric charge signals corresponding to this image of the photographic subject that is formed upon its image capturing surface and letting the accumulated electric charges swept out; and an A/D conversion circuit 201 converts an analog image signal that is outputted from the image-capturing element 20 into a digital image signal, and outputs the converted digital image signal to an image processing circuit 202. In this image processing circuit 202, image processing such as white balance adjustment, sharpness adjustment, gamma correction, tone adjustment and the like is performed upon this digital image signal that is inputted, and the resulting signal is outputted to a control circuit 200 as image data.

The control circuit 200 is a micro computer that performs control of this electronic camera, and includes a CPU, a ROM, a RAM and various peripheral circuitry. Furthermore, the control circuit 200 outputs the digital image signal that is inputted from the image processing circuit 202 to a compression/decompression circuit 204 so as to compress the input digital image signal according to a method such as JPEG or the like displays an image upon a liquid crystal monitor 205 that consists of an LCD or the like and records the compressed image signal in a buffer memory 206 or a recording medium 207.

A photometric circuit 203 converts an analog photometric signal obtained from the photometric sensor 40 into a digital photometric signal, and outputs the digital photometric signal to the control circuit 200. The control circuit 200 calculates a shutter speed and an aperture value for the photographic lens 120, based upon the luminance of the photographic subject that is calculated based upon this inputted photometric signal, and upon the imaging sensitivity (ISO sensitivity).

A power supply switch 3 and a release button 4 are provided to this electronic camera. Each of a half press switch 47 and a full press switch 48, outputs a corresponding ON signal or OFF signal to the control circuit 200. The switches 47 and 48 operate together with depression actuation of a release button 4 so as to be turned ON and OFF.

When the reproduction button 111 is operated by the user, the reproduction switch 111A outputs a changeover signal to the control circuit 200 for changing over the operation of the electronic camera between, for example, a single image reproduction mode and a photographic mode. When the menu button 112 is operated, a menu display signal is outputted from a menu switch 112A, and the control circuit 200 displays a menu screen upon the liquid crystal monitor 205, for setting various types of operation of the electronic camera. When a reduction command signal is outputted from a reduction switch 113A along with depression operation of the reduction button 113, the control circuit 200 reduces the image displayed upon the liquid crystal monitor 205 by a predetermined reduction ratio. When, in the single image reproduction mode, the reduction button 113 is operated during display of a reproduced image upon the liquid crystal monitor 205, then the control circuit 200 transits to a thumbnail display mode in which a thumbnail image is displayed upon the liquid crystal monitor 205. And, when an enlargement command signal is outputted from an enlargement switch 114A along with depression operation of the enlargement button 114, the control circuit 200 enlarges the image displayed upon the liquid crystal monitor 205 by a predetermined magnification ratio. Furthermore when, in the single image reproduction mode, the enlargement button 114 is operated during display of a reproduced image upon the liquid crystal monitor 205, then the control circuit 200 changes a single image display upon the liquid crystal monitor 205 to a magnified image display according to a magnified reproduction mode that will be described hereinafter. And, when the protection button 115 is operated and a protection command signal is outputted from the protection switch 115A, the control circuit 200 applies protection to the image data, so that the reproduced image cannot be mistakenly deleted.

When the command dial 116 is operated, according to the details of this operation, a right operation signal and a left operation signal are outputted from a switch 116A that is constituted, for example, as a rotary switch. During operation of the electronic camera in the photographic mode, setting for the imaging sensitivity and the exposure mode and the like are performed by operation of this command dial 116. Furthermore, if the command dial 116 is operated in the rightwards direction while the electronic camera is performing reproduced image display, the display image advances by one frame, while, if it is operated in the leftwards direction, the display image returns by one frame. The operation member 117 may, for example, consist of a cruciform key or the like. When an up operation signal, a down operation signal, a left operation signal, or a right operation signal is outputted according to the operation of an up button, a down button, a left button, or a right button that constitute the operation member 117, selection of various types of menu upon a menu screen is performed by the control circuit 200. In the single image reproduction mode, the operation member 117 is used in a similar manner to the command dial 116, when performing advancing of the display image by a shot or returning it by a shot. Furthermore, in the magnified reproduction mode, the control circuit 200 changes the center coordinate point of the reproduction image during enlarged reproduction display, based upon the operation signal inputted from a switch 117A. When the OK button 118 is operated and an operation signal is outputted from a switch 118A, the control circuit 200 terminates the display of the reproduced image according to the magnified reproduction mode and performs display of the reproduced image in the single image reproduction mode. And, when the deletion button 119 is operated, a delete command signal is outputted from a deletion switch 119A, and image data to which protection by the protection button 115 is not applied is deleted by the control circuit 200 from the buffer memory 206 or the recording medium 207.

In the single image reproduction mode that has been set by operation of the reproduction button 111, the control circuit 200 acquires reproduction image file information that has been recorded in the buffer memory 206 or upon the recording medium 207, and reads out the image data of this reproduction image file. The image data that has thus been read out is decompressed into the original image data by the compression/decompression circuit 204 and the image corresponding to the decompressed original image data is displayed upon the liquid crystal monitor 205. The read out image data is stored into the buffer memory 206 by the control circuit 200.

Figure 3A:
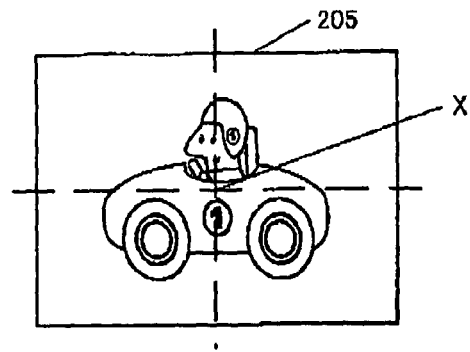
FIG. 3A shows a reproduced image that is being displayed upon a liquid crystal monitor.
Figure 3B:
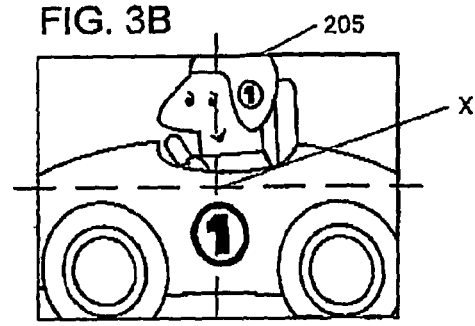
FIG. 3B shows a case in which the reproduced image shown in FIG. 3A is being enlarged by a predetermined magnification ratio.

The display of an enlarged reproduction image by the control circuit 200 will now be explained with reference to FIG. 3. In the magnified reproduction mode that has been set by operation of the enlargement button 114, the control circuit 200 reads out the image data for enlarged reproduction to store it in the buffer memory 206. If an enlargement position flag is not set in the image data for enlarged reproduction, then the center coordinate point X of the image data for enlarged reproduction that has been read out is recognized as the center coordinate point for enlargement, and the image is enlarged at a predetermined display magnification ratio with the recognized center coordinate point and is displayed upon the liquid crystal monitor 205. In other words, as shown in FIG. 3B, the reproduced image that has been displayed as shown in FIG. 3A is displayed as enlarged, taking the center of the reproduced image as a reference. When the enlargement button 114 is operated, the control circuit 200 raises the display magnification ratio for the image data for enlarged reproduction by one step, still taking the center coordinate point X of the image data for enlarged reproduction as the center coordinate point for enlargement. And the control circuit 200 displays the reproduced image upon the liquid crystal monitor 205 with its display magnification ratio raised by one step, as shown in FIG. 3C and stores the display magnification ratio in the buffer memory 206.

Figure 3D:
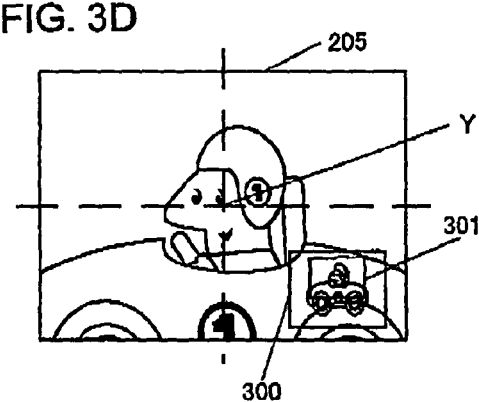
FIG. 3D shows a case in which the center of the reproduced image shown in FIG. 3B has been changed.
Figure 3C:
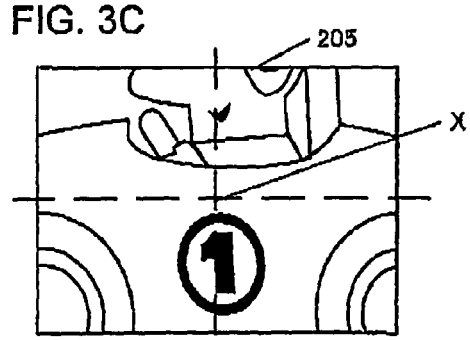
FIG. 3C shows a case in which the image shown in FIG. 3B is being further enlarged.

Furthermore, when the reduction button 113 is operated in the state with the reproduced image being displayed as in FIG. 3C, the control circuit 200 lowers the display magnification ratio of the image data for enlarged reproduction by one step, while still taking the center coordinate point X of the image data for enlarged reproduction as the center coordinate point for enlargement. And the control circuit 200 displays the reproduced image upon the liquid crystal monitor 205 with its display magnification ratio lowered by one step, as shown in FIG. 3B. In this case as well, the display magnification ratio of the image data for enlarged reproduction is stored in the buffer memory 206 by the control circuit 200.

Figure 3E:
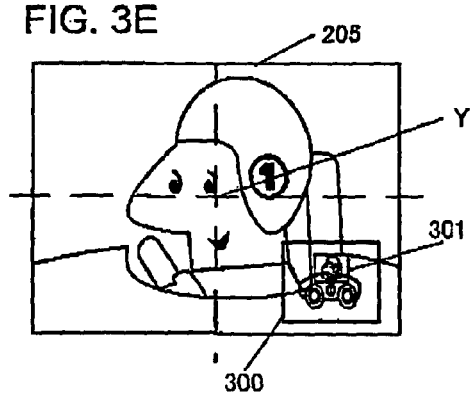
FIG. 3E shows a case in which the reproduced image shown in FIG. 3D has been enlarged by a predetermined magnification ratio.

When the reproduction image is being displayed in the state shown in FIG. 3B and the operation member 117 is operated, the control circuit 200 changes the center of the reproduced image, as shown in FIG. 3D. In this case, the control circuit 200 updates the center coordinate point X of the image data for enlarged reproduction to the center coordinate point Y that corresponds to the center of the reproduced image of FIG. 3D, and stores this center coordinate point in the buffer memory 206. Subsequently, if the reproduced image is reduced or enlarged by operation of the reduction button 113 or the enlargement button 114, then the control circuit 200 changes the display magnification ratio of the image data for reproduction by taking this center coordinate point Y that has thus been updated as the center coordinate for enlargement. In other words, when the reproduced image of FIG. 3D is enlarged, the reproduced image shown in FIG. 3E is displayed.

Figure 7A:
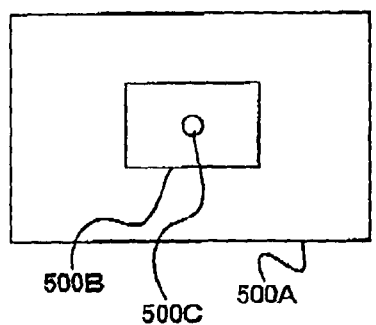
FIGS. 7A through 7E are figures for explanation of a region of original image and a region of reproduction image upon the liquid crystal monitor.
Figure 7B:
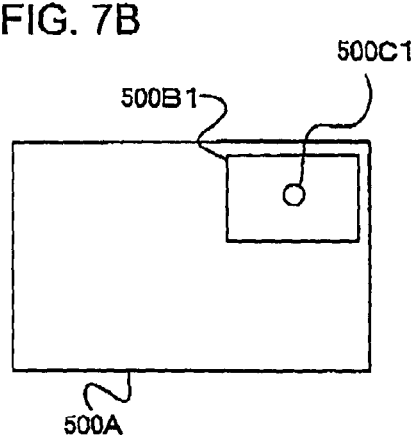

The example in which the control circuit 200 does not store the center coordinate point in the buffer 206 will be explained with reference to FIG. 7. In FIG. 7, a rectangular 500A, rectangular 500B, and a point 500C indicate the whole region of the original image, the region of the magnified reproduction image displayed upon the liquid crystal monitor 205, and the center coordinate point Y stored in the buffer 206 respectively. FIG. 7A shows the example in which the center coordinate point of the rectangular 500A and the center coordinate of the rectangular 500B are the same. FIG. 7B shows the example in which the center coordinate point Y is changed in accordance with the operation of the operation member 117 from the state shown in FIG. 7A. The image corresponding to the rectangular 500B1 with the center point 500C1 among the original image indicated by the rectangular 500A is displayed upon the liquid crystal monitor 205.

Figure 7C:
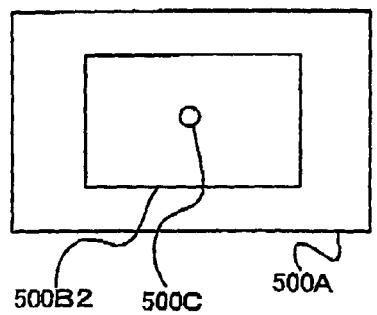

In the state shown in FIG. 7A, since the display magnification ratio of the reproduction image displayed upon the liquid crystal monitor 205 decreases in response to the operation of the reduction button 113, the relation between the rectangular 500A and 500B2 is changed with the point 500C being as the center coordinate point as shown in FIG. 7C. Namely, the region indicated by the rectangular 500B2 in the rectangular 500A indicating has a larger size than that of the region 500B shown in FIG. 7A.

Figure 7D:
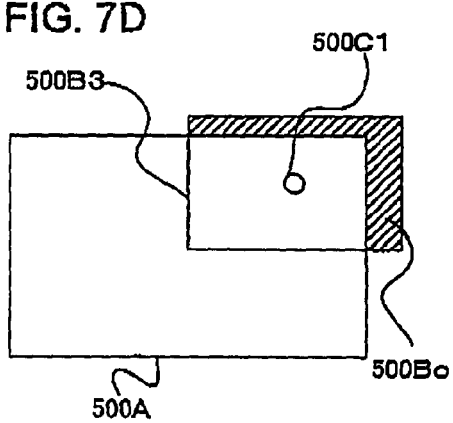
Figure 7E:
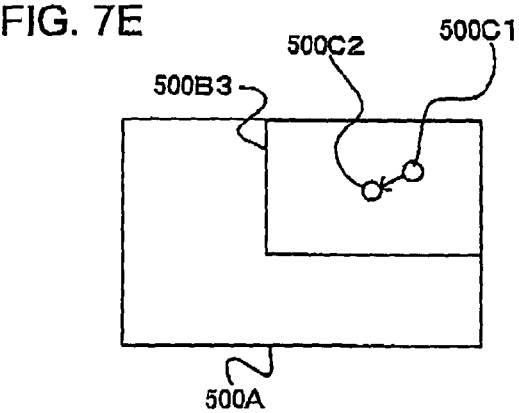

If the reduction button 113 is operated when the magnified reproduction image corresponding to the region indicated by the rectangular 500B1 centered at the point 500C1 as shown in FIG. 7B is displayed upon the liquid crystal monitor 205, the part of a rectangular 500B3 with the center point 500C1 corresponding to a region of the reduced image to be displayed upon liquid crystal monitor 205 is extended out of the rectangular 500 A indicating the original image as shown in FIG. 7D. However, as shown in FIG. 7D, the original image in a hatched region 500B0 of the rectangular 500B3 does not exist. Then, the control circuit 200 changes the point 500C1 indicating the center of the rectangular 500B3 to the point 500C2 indicating the center of the region 500B3 in FIG. 7E so that the range of the rectangular 500B3 is included in the rectangular 500A indicating the original image. As the result, the image corresponding to the rectangular 500B3 with a center point 500C2 included in the rectangular 500A indicating an area of the original image is displayed in an offset display manner upon the liquid crystal monitor 205.

When the reproduction image with the center coordinate point having been changed as the manner stated above is displayed in an offset display manner upon the liquid crystal monitor 205, the control circuit 200 does not store the changed center coordinate point Y in the buffer memory 206. In other words, the control circuit 200 stores the center coordinate point Y that has been changed based upon operation of the operation member 117 in the buffer memory 206.

If, as described above, in the state in which the center of the reproduction image has been changed, if the display magnification ratio returns to unity due to operation of the reduction button 113, in other words if the system returns to the single image reproduction mode, then the control circuit 200 sets the enlargement position flag while keeping the center coordinate point Y just as it is. When the enlargement button 114 is operated in the state with the enlargement position flag being set, the control circuit 200 changes the display magnification ratio of the image data for enlarged reproduction while using the center coordinate point Y as the center coordinate point for enlargement, and displays the reproduction image upon the liquid crystal monitor 205 with its display magnification ratio changed.

In other words, when the enlargement button 114 is operated in the state in which the control has returned to the processing in which the reproduction image shown in FIG. 3A, the enlarged reproduction image is displayed as shown in FIG. 3D. It should be understood that, if the camera is changed over from the magnified reproduction mode to the single image reproduction mode by operation of the OK button 118, or if in this single image reproduction mode, frame advance or frame return is not performed with the command dial 116 or the operation member 117, then this enlargement position flag is maintained.

When the reproduction image is being displayed as enlarged, if reduction operation or enlargement operation is performed with the reduction button 113 or the enlargement button 114, or if shift operation for the reproduction image upon the liquid crystal monitor 205 is performed with the operation member 117 in the upward, downward, leftward, or rightward direction, then the control circuit 200 displays a navigation screen 300, as shown in FIGS. 3D and 3E. This navigation screen 300 is a screen that is displayed in order for the user to be able to ascertain the original image of the magnified reproduction image, and it is displayed as superimposed upon a predetermined small area of the liquid crystal monitor 205 in a semi-transparent state, over the enlarged reproduction image. A frame 301 within this navigation screen 300 is for showing the position that the enlarged reproduction image occupies with respect to the original image of the magnified reproduction image. It should be understood that this navigation screen 300 is displayed for a predetermined time period, for example for two seconds, after any one of the reduction button 113, the enlargement button 114, or the operation member 117 has been operated.

Next, using the flow charts of FIGS. 4 and 5, various component processes of the operation for reproduced image display by the camera according to this embodiment will be explained. It should be understood that the various processes shown in these flowcharts are performed by the control circuit 200 executing a control program. Furthermore, this flow chart is started when the reproduction button 111 is operated, and a changeover signal to the single image reproduction mode is inputted from the replay switch 111A.

In a step S101 an enlargement position flag is cleared to 0, and then the flow of control proceeds to a step S102. In this step S102 file information for the reproduction image file is acquired, and then the flow of control proceeds to a step S103. And in this step S103 the image data for the reproduction image file that has been acquired in the step S102 is read out from the buffer memory 206 or the recording medium 207, and then the flow of control proceeds to a step S104.

In the step S104, the image data that has been read out in the step S103 is decompressed into its original image data by the compression/decompression circuit 204, the original image data is stored into the buffer memory 206, and then the flow of control proceeds to a step S105. In this step S105, the original image data that has been decompressed in the step S104 is displayed upon the liquid crystal monitor 205, and then the flow of control proceeds to a step S106.

In this step S106, a decision is made as to whether or not the reproduction button 111 has been operated. If a changeover signal has been inputted from the reproduction switch 111A, then an affirmative decision is reached in this step S106, and the flow of control proceeds to a step S107. In this step S107 the single image reproduction is terminated, and moreover the liquid crystal monitor 205 is turned OFF and this series of processes terminates. But, if no changeover signal has been inputted from the reproduction switch 111A, then a negative decision is reached in the step S106, and the flow of control proceeds to a step S108.

In this step S108, a decision is made as to whether or not the menu button 112 has been operated. If a menu display signal has been inputted from the menu switch 112A, then an affirmative decision is reached in this step S108, and the flow of control proceeds to a step S109. In this step S109, the single image reproduction mode is terminated, a menu screen for performing various types of settings is displayed upon the liquid crystal monitor 205, and this series of processes terminates. But, if no menu signal has been inputted from the menu switch 112A, then a negative decision is reached in the step S108, and the flow of control proceeds to a step S110.

In this step S110, a decision is made as to whether or not the enlargement button 114 has been operated. If an enlargement command signal has been inputted from the enlargement switch 114A, then an affirmative decision is reached in this step S110, and the flow of control proceeds to a step S111. In this step S111, an enlargement reproduction subroutine that will be described hereinafter is called up, and an enlargement reproduction processing is performed. But, if no enlargement command signal has been inputted from the enlargement switch 114A, then a negative decision is reached in the step S110, and the flow of control proceeds to a step S112.

In this step S112, a decision is made as to whether or not the reduction button 113 has been operated. If a reduction command signal has been inputted from the reduction switch 113A, then an affirmative decision is reached in this step S112, and the flow of control proceeds to a step S113. In this step S113, the thumbnail reproduction image is displayed upon the liquid crystal monitor 205. But, if no reduction command signal has been inputted from the reduction switch 113A, then a negative decision is reached in the step S112, and the flow of control proceeds to a step S114.

In this step S114, a decision is made as to whether or not the deletion button 119 has been operated. If a deletion command signal has been inputted from the deletion switch 119A, then an affirmative decision is reached in this step S114, and the flow of control proceeds to a step S115, in which processing is performed for deleting the image data for the reproduction image that is being displayed from the buffer memory 206 or the recording medium 207. But, if no deletion command signal has been inputted from the deletion switch 119A, then a negative decision is reached in the step S114, and the flow of control proceeds to a step S116.

In this step S116, a decision is made as to whether or not the protection button 115 has been operated. If a protection command signal has been inputted from the protection switch 115A, then an affirmative decision is reached in this step S116, and the flow of control proceeds to a step S117, in which protection processing is performed for protecting the image data for the reproduction image that is being displayed. But, if no protection command signal has been inputted from the protection switch 115A, then a negative decision is reached in the step S116, and the flow of control proceeds to a step S118.

In this step S118, a decision is made as to whether or not the command dial 116 has been operated in the rightwards direction, or the right button of the operation member 117 has been operated. If a rightwards direction operation signal has been inputted from the switch 116A or the switch 117A, then an affirmative decision is reached in this step S118, and the flow of control proceeds to a step S119. In this step S119, information for the next image file after the reproduction image that is currently being displayed upon the liquid crystal monitor 205 is acquired, and then the flow of control is transferred to a step S122. But, if no rightwards direction operation signal has been inputted from the switch 116A or the switch 117A, then a negative decision is reached in the step S118, and the flow of control proceeds to a step S120.

In this step S120, a decision is made as to whether or not the command dial 116 has been operated in the leftwards direction, or the left button of the operation member 117 has been operated. If a leftwards direction operation signal has been inputted from the switch 116A or the switch 117A, then an affirmative decision is reached in this step S120, and the flow of control proceeds to a step S121. In this step S121, information for the previous image file before the reproduction image that is currently being displayed upon the liquid crystal monitor 205 is acquired, and then the flow of control is transferred to a step S122. But, if no leftwards direction operation signal has been inputted from the switch 116A or the switch 117A, then a negative decision is reached in the step S120, and the flow of control returns to the step S105.

In the step S122, a decision is made as to whether or not the enlargement position flag i for the image data that is currently being displayed is 1. If the enlargement position flag is 1, then an affirmative decision is reached in this step S122 and the flow of control proceeds to a step S123, in which the enlargement position flag i is reset to 0, and then the flow of control returns to the step S103. But if the enlargement position flag is 0, then a negative decision is reached in the step S122, and the flow of control returns to the step S103.

The subroutine for enlargement reproduction of the step S111 of FIG. 4 will now be explained using the flow chart shown in FIG. 5.

In a step S201 the image data for enlargement reproduction is read out, and then in a step S202 the image data that has thus been read out in the step S210 is decompressed and stored in the buffer memory 206, and the flow of control proceeds to a step S203.

In the step S203, a decision is made as to whether or not the enlargement position flag i is 1. If the enlargement position flag i is 1, then an affirmative decision is reached in this step S203, and the flow of control proceeds to a step S204. But, if the enlargement position flag i is not 1, then a negative decision is reached in this step S203, and the flow of control proceeds to a step S205.

In the step S204, the display magnification ratio is initialized with the center coordinate point for enlargement of the image data for enlargement reproduction being kept just as it is at the center coordinate point Y, and then the flow of control proceeds to a step S206. And, in the step S205 the display magnification ratio of the image data for reproduction is initialized with the center coordinate point for enlargement being set to the center coordinate point X, and then the flow of control proceeds to the step S206. In this step S206, the reproduction image is enlarged and displayed upon the liquid crystal monitor 205 based upon the display magnification ratio that has been initialized in the step S204 or the step S205, and upon the center coordinate point X or Y, and then the flow of control proceeds to a step S207. In execution of step 206, the center coordinate point is changed depending on the following condition as explained earlier. If a range of image to be reduced is beyond a range of an original image when an image is reduced and displayed with the center coordinate point stored in the buffer memory 206, the center coordinate point is changed so that the range of image to be reduced is not beyond the range of the original image. The changed center coordinate point is not stored in the buffer memory 206. As described above, the center coordinate point that has been changed in this case is not stored in the buffer memory 206.

In the step S207 a timer not shown in the figures is started. In a step S208 the navigation screen 300 is displayed as superimposed upon the reproduction image in a predetermined small area of the liquid crystal monitor 208, and then the flow of control proceeds to a step S209. The various processes from the step S209 (reproduction button operation decision) through the step S212 (reproduction mode termination and menu screen display) are performed by executing similar processing to the processing from the step S106 (reproduction button operation decision) through the step S109 (reproduction mode termination and menu screen display).

In the step S213, a decision is made as to whether or not the enlargement button 114 has been operated. If an enlargement command signal has been inputted from the enlargement switch 114A, then an affirmative decision is reached in this step S213, and the flow of control proceeds to a step S214. In this step S214, the display magnification ratio for the image data for enlargement reproduction is raised by one step, and then the flow of control proceeds to a step S219. But, if no enlargement command signal has been inputted from the enlargement switch 114A, then a negative decision is reached in this step S213, and the flow of control proceeds to a step S215.

In the step S215, a decision is made as to whether or not the reduction button 113 has been operated. If a reduction command signal has been inputted from the reduction switch 113A, then an affirmative decision is reached in this step S215, and the flow of control proceeds to a step S216. But, if no reduction command signal has been inputted from the reduction switch 113A, then a negative decision is reached in this step S215, and the flow of control proceeds to a step S221.

In the step S216, the display magnification ratio that is stored in the buffer memory 206 is referred to, and a decision is made as to whether or not the magnification of the reproduced image is unity, in other words as to whether or not single image reproduction is to be performed. If it is unity, then an affirmative decision is reached in this step S216, and the flow of control proceeds to a step S217. But, if it is not unity, then a negative decision is reached in this step S216, and the flow of control proceeds to a step S218.

Figure 4:
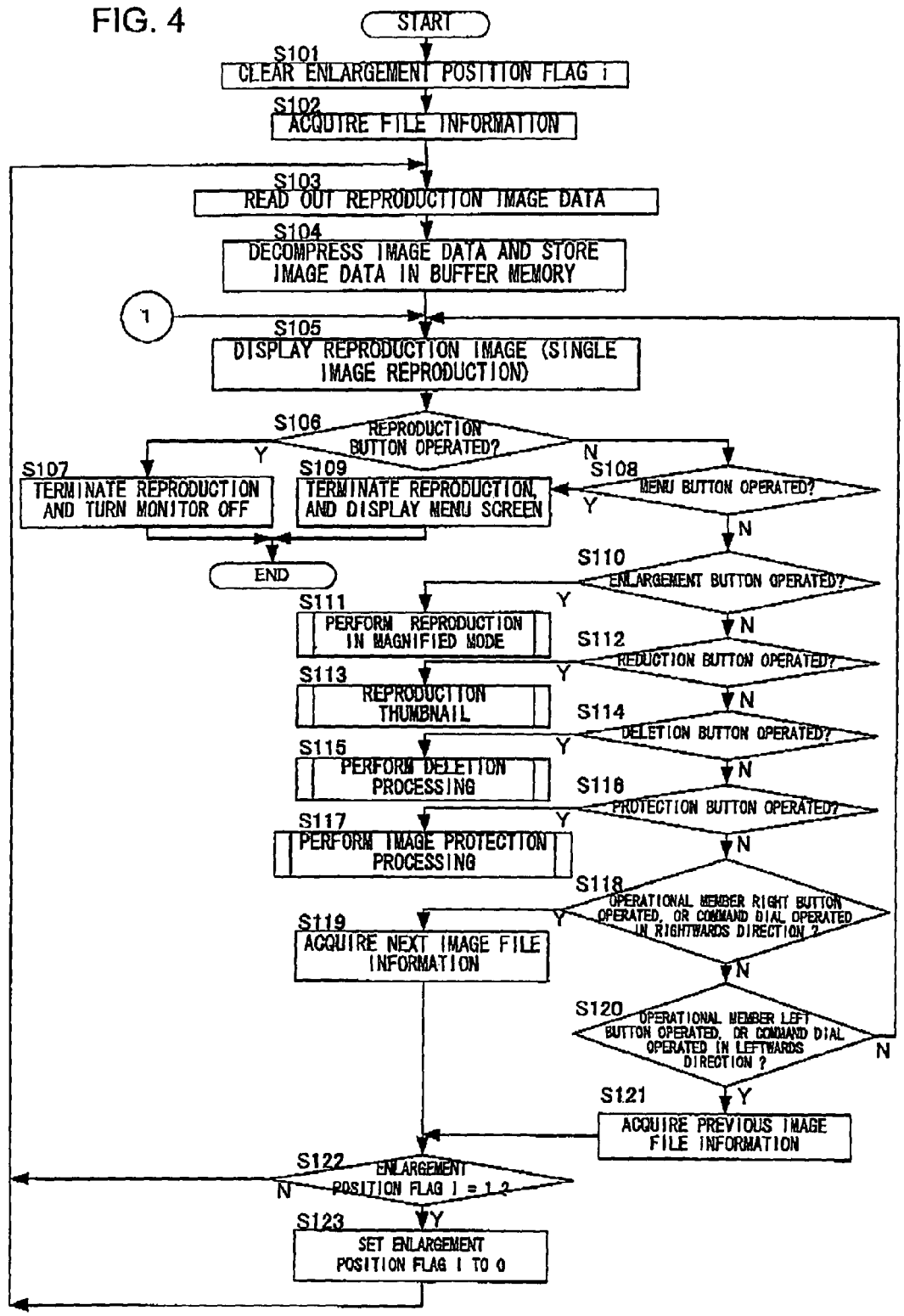
FIG. 4 is a flow chart for explanation of the operation of this camera in a single image reproduction mode.
Figure 5:
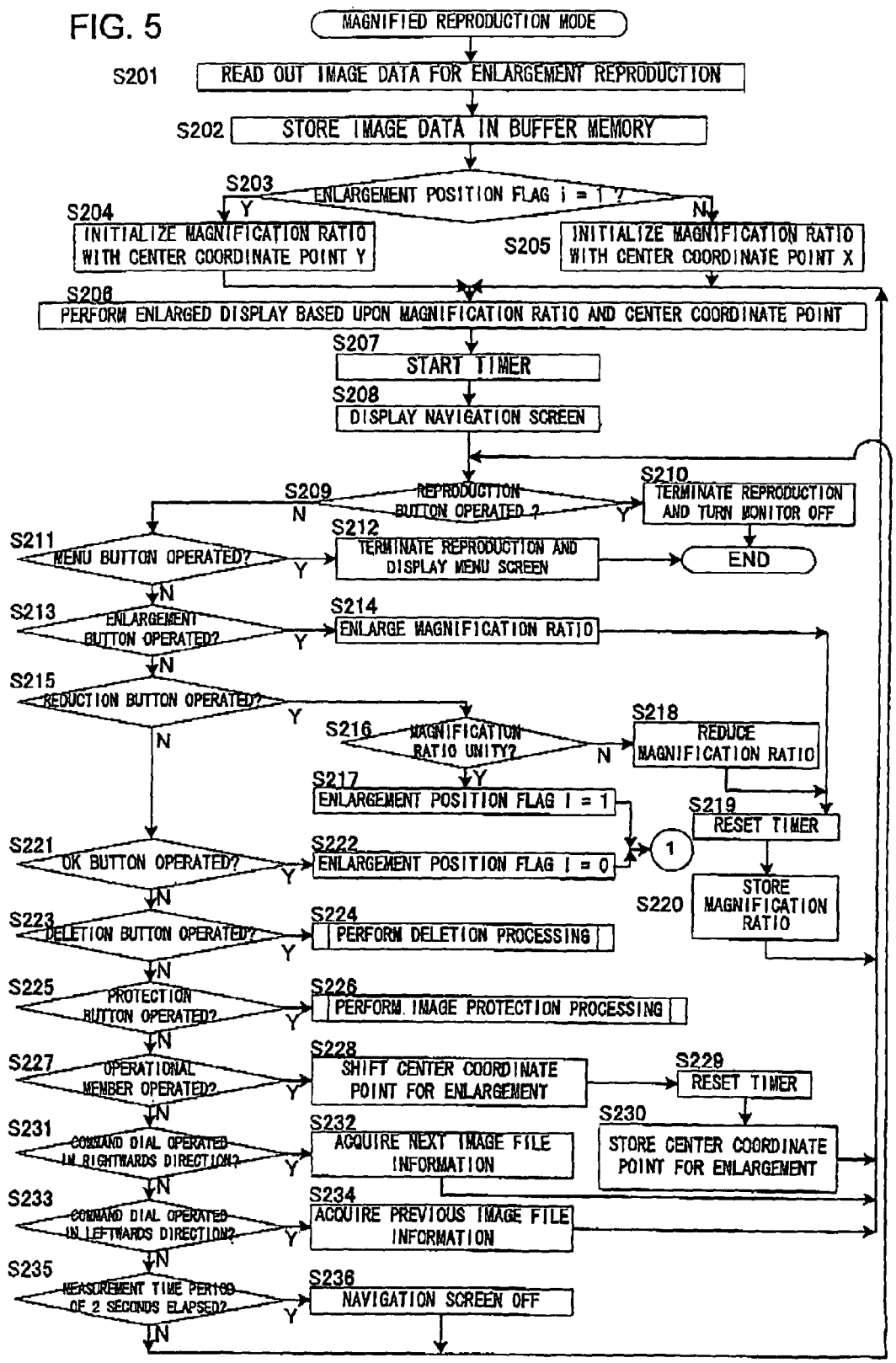
FIG. 5 is a flow chart for explanation of the operation of this camera in a magnified reproduction mode.

In the step S217, the enlargement position flag i of the image data for enlargement reproduction is set to 1, and then the flow of control returns to the step S105 of FIG. 4. And, in the step S218, the display magnification ratio for the image data for enlargement reproduction is lowered by one step, and then the flow of control proceeds to the step S219. In this step S219, the timer that was started in the step S207 is reset to zero and time measurement is started for a second time, and then in a step S220 the display magnification ratio of the image data for enlargement reproduction is stored in the buffer memory 206, and the flow of control returns to the step S206.

In the step S221, a decision is made as to whether or not the OK button 118 has been operated or not. If an operation signal is inputted from the switch 118A, then an affirmative decision is reached in this step S221, and the flow of control proceeds to a step S222. In this step S222, the enlargement position flag i of the image data for enlargement reproduction is set to 0, and then the flow of control returns to the step S105 of FIG. 4. But, if no operation signal is inputted from the switch 118A, then a negative decision is reached in this step S221, and the flow of control proceeds to a step S223.

The various processes from the step S223 (deletion button operation decision) through the step S226 (image protection processing) are performed by executing similar processing to the processing from the step S114 (deletion button operation decision) through the step S117 (image protection processing). In the step S227, a decision is made as to whether or not the operation member 117 has been operated or not. If an operation signal has been inputted from the switch 117A, then an affirmative decision is reached in this step S227, and the flow of control proceeds to a step S228. But, if no operation signal is inputted from the switch 117A, then the flow of control proceeds to a step S231.

In the step S228, the center coordinate point Y of the image data for enlargement reproduction is calculated based upon the operated direction of the operation member 117, and then the flow of control proceeds to a step S229. In this case, if the center coordinate point of the reproduction image that is being displayed upon the liquid crystal monitor 205 and the center of the enlargement reproduction image that has been stored in the buffer memory 206 are the same, then the center coordinate point Y is calculated by taking the center coordinate point for enlargement that has been stored in the buffer memory 206 as a base point. But, if the center coordinate point of the reproduction image that is being displayed upon the liquid crystal monitor 205 and the center of the enlargement reproduction image that has been stored in the buffer memory 206 are different from one another, then the center coordinate point Y is calculated by taking the display center of the reproduced image that is being displayed upon the liquid crystal monitor 205 as a base point. And, in the step S229, the timer is reset to zero and time measurement is started for a second time in a manner similar to that performed in the step S229, and then in a step S230 the center coordinate point Y that has been calculated in the step S228 is stored in the buffer memory 206, and then the flow of control returns to the step S206.

In the step S231, a decision is made as to whether or not the command dial 116 has been operated in the rightwards direction. If a rightwards operation signal has been inputted from the switch 116A, then an affirmative decision is reached in this step S231, and the flow of control proceeds to a step S232, the information for the next image file after that of the reproduction image that is being displayed upon the liquid crystal monitor 205 is acquired, and then the flow of control returns to the step S206. But, if no rightwards operation signal has been inputted from the switch 116A, then a negative decision is reached in this step S231, and the flow of control proceeds to a step S233.

In the step S233, a decision is made as to whether or not the command dial 116 has been operated in the leftwards direction. If a leftwards operation signal has been inputted from the switch 116A, then an affirmative decision is reached in this step S233, and the flow of control proceeds to a step S234, the information for the previous image file before that of the reproduction image that is being displayed upon the liquid crystal monitor 205 is acquired, and then the flow of control returns to the step S206. But, if no leftwards operation signal has been inputted from the switch 116A, then a negative decision is reached in this step S233, and the flow of control proceeds to a step S235.

And, in this step S235, a decision is made as to whether or not the time period measured by the timer is greater than two seconds. If two seconds has elapsed, then an affirmative decision is reached in this step S235, the flow of control proceeds to a step S236, the navigation screen 300 of which the display was started in the step S208 is deleted from the liquid crystal monitor 205, and then the flow of control returns to the step S209. But, if two seconds has not elapsed, then a negative decision is reached in this step S235, and the flow of control returns to the step S209.

According to the embodiment explained above, the following advantageous operational effects are obtained:

(1) If the photographer returns to the single image reproduction mode by operation of the reduction button 113, then it is considered that the possibility is high that the photographer may have unintentionally terminated the magnified reproduction mode by repeating the reduction operation. Due to this, in this embodiment, it is arranged to set the enlargement position flag i to 1 when the magnified reproduction mode is terminated due to operation of the reduction button 113 and the system returns to the single image reproduction mode. Moreover, in the magnified reproduction mode, it is arranged to store the center coordinate point Y of the image data that has been shifted by operation of the enlargement button 114 or of the operation member 117 in the buffer memory 206. Accordingly, when performing enlargement display of this image for a second time, it is possible to perform this second time enlargement operation by taking this center coordinate point Y as the center coordinate point for enlargement. Due to this, the ease of use during image viewing is enhanced, since the photographer does not need to set the center of the enlargement reproduction image a second time by operation of the operation member 117.

(2) If the system is returned to the single image reproduction mode by operation of the OK button 118, then it is considered that the possibility is high that the photographer has terminated the enlargement reproduction intentionally, and that the possibility is low that the photographer will perform enlargement operation for the same image for a second time, or that he will perform enlargement reproduction for a second time based upon the center coordinate point that is stored. Due to this, it is arranged, in this embodiment, to reset the enlargement position flag i to 0 if the system is returned to the single image reproduction mode by single operation of the OK button 118; and accordingly, if this image is displayed as enlargement reproduction image for a second time, then it is possible to perform this enlargement reproduction by taking the initial center coordinate point as the center coordinate point for enlargement, so that the ease of use during image viewing is enhanced.

(3) Furthermore, even if the system is returned to the single image reproduction mode by operation of the reduction button 113 and the enlargement position flag i is set to 1, then, if the image that is being reproduced has been advanced or returned by operation of the command dial 116 or of the operation member 117, then it is considered that the possibility is high that the photographer does not have any intention to display the same display image as enlargement reproduction image for a second time. Due to this, with the camera according to this embodiment, even if the system is returned to the single image reproduction mode with the reduction button 113, if the image that is being reproduced is advanced or returned by operation of the command dial 116 or of the operation member 117, then it is arranged to reset the enlargement position flag i to 0. Accordingly, if the photographer wishes to perform enlargement display of a new image that has been advanced or returned by one frame, then he is able to reproduce it as enlargement reproduction image for a second time by using the initial center coordinate point as the center coordinate point for enlargement; and accordingly that the ease of use during image viewing is enhanced.

(4) It is arranged to superimpose the navigation screen 300, in other words the entire image, upon the reproduced image that is enlarged according to the magnified reproduction mode, and to display both these two screens upon the liquid crystal monitor 205 at predetermined sizes.

Furthermore, it is arranged to display the navigation screen 300 when reduction or enlargement operation is performed with the reduction button 113 or with the enlargement button 114, or when shifting operation in the upwards, downwards, leftwards, or rightwards direction of the image upon the display screen is performed with the operation member 117; and to cancel this display of the navigation screen 300 when two seconds, that is the predetermined time period, has elapsed after such operation. Accordingly, the photographer is able to ascertain the position that the reproduced image that has been enlarged occupies with respect to the original image of the magnified reproduction image, and, after the predetermined time period has elapsed, he is also able to check the portion of the enlargement reproduction image that has been hidden by this superimposed display of the navigation screen 300; and thus the convenience of use is enhanced.

Figure 6A:
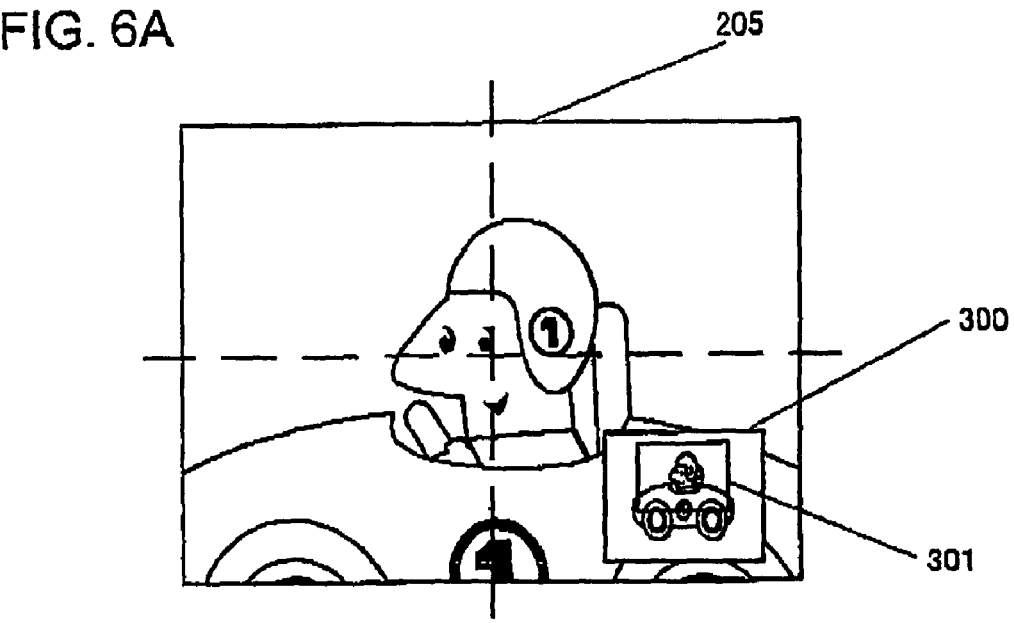
FIGS. 6A and 6B are figures for explanation of a variant embodiment for the display state of a navigation image.
Figure 6B:
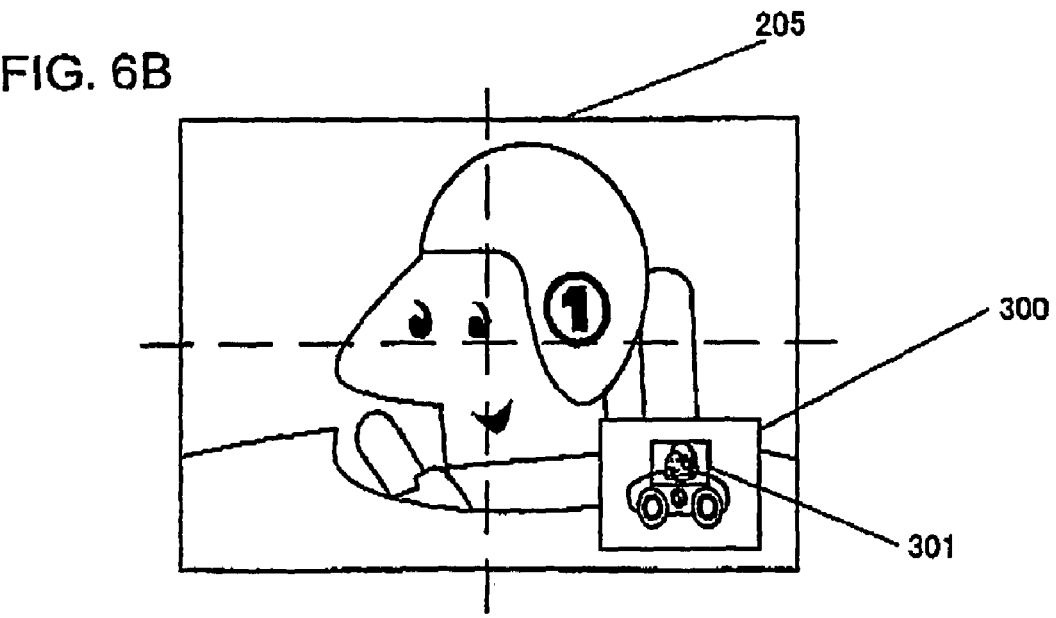

The embodiment that has been explained above may be varied in the following ways:

(1) Instead of superimposing the navigation screen 300 in a semi-transparent state over the reproduced image that is being reproduced as enlarged, it would also be acceptable, as shown in FIG. 6A and FIG. 6B, to arrange to superimpose this navigation screen 300 without making it semi-transparent.

(2) The present invention is not limited to an electronic camera; it would also be acceptable, for example, to apply it to a digital video camera or an image reading device or the like.

The above described embodiments are examples, and various modifications can be made without departing from the spirit and scope of the invention.

What is claimed is:

1. A camera, comprising:
   a storage control unit that stores an image data;
   a display device that displays an image based upon the image data on a display screen;
   a reproduction mode changeover member that, upon operation by a user, outputs a changeover command signal to change over between a single image reproduction mode in which a single image is displayed upon the display device, and a magnified reproduction mode in which a display magnification rate of the image that is displayed upon the display screen can be varied;
   a reproduction mode changeover unit that changes over between the single image reproduction mode and the magnified reproduction mode, according to the changeover command signal;
   a display position command member that, upon operation by the user, outputs a position change signal that commands variation of a center coordinate point of the image displayed upon the display screen;
   a display position change unit that changes the center coordinate point of the image, according to the position change signal;
   a display center storage unit that, in the magnified reproduction mode, stores the center coordinate point of the image that has been varied by the display position change unit;
   an enlargement position flag storage unit that stores either one of a first flag and a second flag,
   (i) a reproduction image being magnified and displayed with the center coordinate point stored in the display center storage unit, when the reproduction mode changeover unit changes over a reproduction mode to the magnified reproduction mode and the first flag is stored in the enlargement position flag storage unit,
   (ii) the reproduction image being magnified and displayed with a fixed coordinate center point of the image set in advance, when the reproduction mode changeover unit changes over the reproduction mode to the magnified reproduction mode and the second flag is stored in the enlargement position flag storage units; and
   a control unit that, when the magnified reproduction mode has been changed to the single image reproduction mode in a first operational manner, stores the first flag in the enlargement position flag storage unit, and, when the magnified reproduction mode has been changed to the single image reproduction mode in a second operational manner, stores the second flag in the enlargement position flag storage unit.

2. A camera according to claim 1, further comprising:
a reduction command member that, in the magnified reproduction mode, upon operation by the user, outputs a reduction command signal for commanding reduction of the display magnification rate of the image; and wherein:
in the first operational manner, the control unit changes the magnified reproduction mode to the single image reproduction mode in accordance with operation of the reduction command member.

3. A camera according to claim 1, wherein:
in the second operational manner, the control unit changes the magnified reproduction mode to the single image reproduction mode based upon a single operation.

4. A camera according to claim 1, wherein:
when the first flag is stored in the enlargement position flag storage unit in the single image reproduction mode, if frame advance or frame return is performed, the control unit stores the second flag in the enlargement position flag storage unit in stead instead of the first flag.

5. A camera according to claim 1, wherein:
when image reproduction in the magnified reproduction mode is commanded in the state in which the first flag is stored in the enlargement position flag storage unit, the display device displays the image at the center of the display screen, the image being magnified with the center coordinate point that is stored in the display center storage unit.

6. A camera according to claim 2, further comprising:
a superimposed display control unit that controls the display device to display an original image of the magnified image in a predetermined small area as superimposed upon the image that has been enlarged in the magnified reproduction mode.

7. A camera according to claim 6, further comprising:
an enlargement command member that, in the magnified reproduction mode, upon operation by the user, outputs an enlargement command signal for commanding enlargement of the display magnification rate of the image; and wherein:
if a predetermined time period has elapsed without any command being issued from the enlargement command member, the reduction command member, and the display position command member, the superimposed display control unit terminates displaying of the original image at the predetermined small area upon the display screen.

8. A camera, comprising:
a display control unit that, in a reproduction display mode including a single image reproduction mode and a magnified reproduction mode, displays an image upon a display device, the image being magnified by using an original image at a display magnification rate that is determined in advance;
an enlargement command member that, upon operation by a user, commands enlargement of the display magnification rate of the image;
a reduction command member that, upon operation by a user, commands reduction of the display magnification rate of the image; and
a display position command member that, upon operation by the user, outputs a position change signal that commands variation of a center coordinate point of the image displayed upon the display device, wherein:
in the magnification reproduction mode, the display control unit displays the original image in a predetermined small area which is superimposed on the magnified reproduction image with the display magnification rate set in advance, and
if a predetermined time period has elapsed without any command being issued from the enlargement command member, the reduction command member, and the display position command member, the display control unit terminates the displaying of the original image in the predetermined small area.

9. A camera according to claim 5, further comprising;
a judging unit that judges whether or not a range of the image to be reduced is beyond a range of an original image of the magnified image displayed upon the display screen when an image is reduced and displayed with the center coordinate point stored in the display center storage unit; and
a center coordinate point change unit that changes the center coordinate point so that the range of the image to be reduced is not beyond the range of the original image, when the judging unit judges that the range of the image to be reduced is beyond the range of the original image.

\* \* \* \* \*